United States Patent
Chau

(10) Patent No.: US 11,833,452 B2
(45) Date of Patent: Dec. 5, 2023

(54) LIQUID TREATMENT DEVICE

(71) Applicant: CANPRO WATER TREATMENT INC., Richmond Hill (CA)

(72) Inventor: Yiu Chau Chau, Hong Kong (CN)

(73) Assignee: CANPRO WATER TREATMENT INC., Richmond Hill (CA)

(*) Notice: Subject to any disclaimer, the term of this patent is extended or adjusted under 35 U.S.C. 154(b) by 357 days.

(21) Appl. No.: 16/942,448

(22) Filed: Jul. 29, 2020

(65) Prior Publication Data

US 2020/0353382 A1 Nov. 12, 2020

Related U.S. Application Data

(63) Continuation of application No. PCT/CN2018/074923, filed on Feb. 1, 2018.

(51) Int. Cl.
*B01D 24/00* (2006.01)
*B01D 24/16* (2006.01)
(Continued)

(52) U.S. Cl.
CPC ......... *B01D 24/008* (2013.01); *B01D 24/165* (2013.01); *B01D 27/02* (2013.01);
(Continued)

(58) Field of Classification Search
CPC ...... B01D 27/148; B01D 29/58; B01D 29/54; B01D 24/008; B01D 24/004; C02F 2201/003
(Continued)

(56) References Cited

U.S. PATENT DOCUMENTS 3,524,552 A * 8/1970 Lyle ............... B01D 29/117
210/342
5,252,206 A * 10/1993 Gonzalez ............ B01D 29/33
210/315
(Continued)

FOREIGN PATENT DOCUMENTS

CN 101180089 5/2008
CN 101801493 8/2010
(Continued)

OTHER PUBLICATIONS

International Searching Authority, "International Search Report," issued in connection with International Patent Application No. PCT/CN2018/074923, dated Oct. 25, 2018, 8 pages. (English translation included).
(Continued)

*Primary Examiner* — Benjamin M Kurtz
(74) *Attorney, Agent, or Firm* — Hanley, Flight & Zimmerman, LLC

(57) ABSTRACT

An embodiment of this disclosure provides a liquid treatment device, provided at a carbon block used for post-treating a liquid treated by the carbon block. The liquid treatment device includes: a housing; a cover; a sealing portion; a lower treatment unit; and an upper treatment unit. The liquid treatment device and the carbon block may be detachably mounted mutually, thereby enabling the liquid treatment device to be replaced independent of the carbon block. Furthermore, the liquid treatment device includes an upper treatment unit and a lower treatment unit, and a liquid inlet is provided in the housing of the liquid treatment device, thereby making distribution of the liquid flow in the carbon block more uniform.

2 Claims, 9 Drawing Sheets

(51) Int. Cl.
- *B01D 27/02* (2006.01)
- *B01D 27/08* (2006.01)
- *B01D 35/30* (2006.01)
- *C02F 1/00* (2023.01)
- *C02F 1/28* (2023.01)
- *C02F 1/50* (2023.01)
- *C02F 1/52* (2023.01)

(52) U.S. Cl.
CPC ............ *B01D 27/08* (2013.01); *B01D 35/30* (2013.01); *C02F 1/001* (2013.01); *C02F 1/283* (2013.01); *B01D 2101/00* (2013.01); *B01D 2201/304* (2013.01); *C02F 1/50* (2013.01); *C02F 1/52* (2013.01); *C02F 2001/5218* (2013.01); *C02F 2201/004* (2013.01); *C02F 2201/006* (2013.01)

(58) Field of Classification Search
USPC ........................................ 210/315, 338, 342
See application file for complete search history.

(56) References Cited

U.S. PATENT DOCUMENTS

| | | | |
|---|---|---|---|
| 5,537,832 | A | 7/1996 | Keus |
| 10,207,206 | B2 * | 2/2019 | Chau .................. B01D 35/30 |
| 2003/0019807 | A1 | 1/2003 | Beard et al. |
| 2009/0078636 | A1 | 3/2009 | Uchi et al. |
| 2010/0193417 | A1 | 8/2010 | Gohl et al. |
| 2010/0219117 | A1 | 9/2010 | Reiland et al. |
| 2011/0303600 | A1 | 12/2011 | Honermann et al. |
| 2014/0048469 | A1 | 2/2014 | Wilder et al. |
| 2015/0157968 | A1 | 6/2015 | Ardes |
| 2017/0014739 | A1 | 1/2017 | Roesgen et al. |
| 2017/0087484 | A1 | 3/2017 | Chau |
| 2017/0106317 | A1 | 4/2017 | Stamey, Jr. et al. |
| 2019/0366247 | A1 | 12/2019 | Ardes |

FOREIGN PATENT DOCUMENTS

| | | | |
|---|---|---|---|
| CN | 102772943 | 11/2012 | |
| CN | 104436813 | 3/2015 | |
| CN | 104540569 | 4/2015 | |
| CN | 105709480 | 6/2016 | |
| CN | 105848750 | 8/2016 | |
| CN | 105899271 | 8/2016 | |
| CN | 106582091 | 4/2017 | |
| DE | 102009005550 | 8/2009 | |
| EP | 1 118 368 A2 | 7/2001 | |
| KR | 200 390 280 Y1 | 7/2005 | |
| KR | 20080008209 | 1/2008 | |
| KR | 20170121400 | 11/2017 | |
| WO | 2010040797 | 4/2010 | |
| WO | 2015192341 | 12/2015 | |
| WO | WO-2015192341 A1 * | 12/2015 | ............ B01D 27/08 |
| WO | 2019148415 | 8/2019 | |

OTHER PUBLICATIONS

China National Intellectual Property Administration, "Office Action", issued in connection with Chinese Patent Application No. 201880087685.4 dated Apr. 20, 2022, along with English language machine translation obtained from the European Patent Office, 20 pages.

China National Intellectual Property Administration, "Search Report", issued in connection with Chinese Patent Application No. 2018800876854.4 dated Apr. 12, 2022, along with English language machine translation, 4 pages.

International Bureau, "International Preliminary Report on Patentability," issued in connection with International Patent Application No. PCT/CN2018/074923, dated Aug. 4, 2020, 13 pages. (English translation included).

European Patent Office, "Extended European Search Report," issued in connection with European Patent Application No. 18903762.5, dated Jun. 30, 2021, 7 pages.

The State Intellectual Property Office of People's Republic of China, "Office Action", issued in connection with Chinese Patent Application No. 201880087685.4 dated Oct. 15, 2021, 17 pages (English Translation Included).

China National Intellectual Property Administration, "Search Report" issued in connection with Chinese Patent Application No. 2018800876854 dated Sep. 23, 2021, 6 pages (English Translation Included).

International Searching Authority "Written Opinion", issued in connection with International Patent Application No. PCT/CN2018/074923 dated Oct. 25, 2018, 4 pages.

China National Intellectual Property Administration, "Decision of Rejection", issued in connection with CN Patent Application No. 201880087685A dated Mar. 1, 2023, 20 pages.

European Patent Office, "Communication Pursuant to Article 94(3) EPC", issued in connection with European Patent Application No. 18 903 762.5 dated Jul. 24, 2023, 5 pages.

* cited by examiner

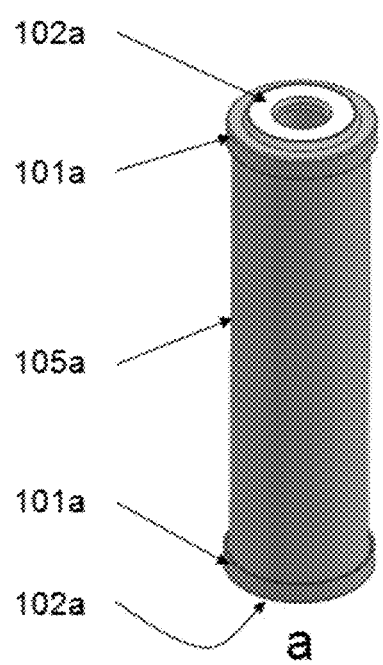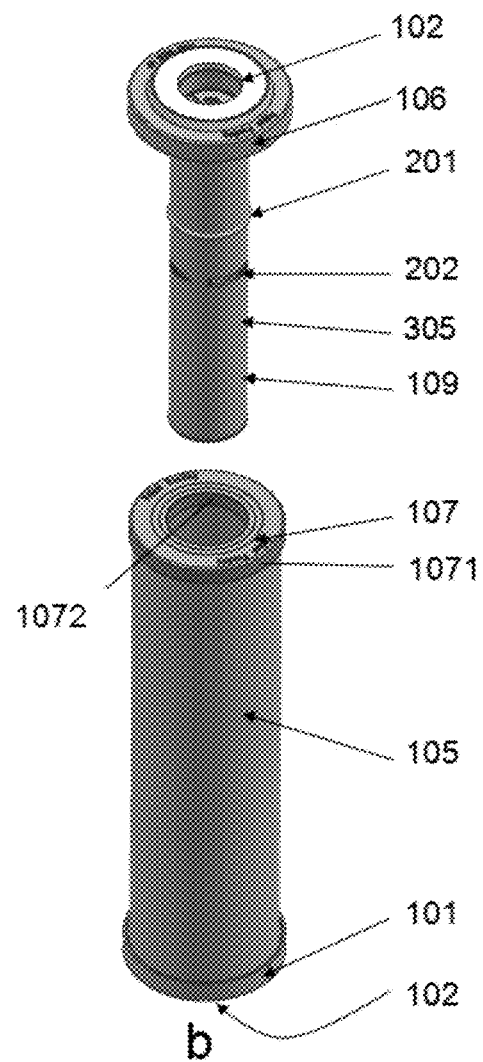
FIG. 2a
(Prior Art)
FIG. 2b

LIQUID TREATMENT DEVICE

CROSS REFERENCE TO RELATED APPLICATION

This present application is a continuation of International Application No. PCT/CN2018/074923, filed on Feb. 2, 2018, which is hereby incorporated by reference in its entirety.

TECHNICAL FIELD

This disclosure relates to the field of fluid treatment technologies, and in particular to a liquid treatment device.

BACKGROUND

A liquid treatment device generally treats various liquids such as water and ethanol by using one or more liquid treatment media, and usually includes one or more liquid treatment units containing the liquid treatment media. When the liquid passes through the liquid treatment media, impurities and contaminants therein are removed by physical and chemical interaction with the liquid treatment media. A typical example of such a liquid treatment device is a device for purifying and softening water, through which, on the one hand, chemical contaminants such as chlorine, heavy metals, sulfides, and particulate contaminants in the liquid are removed, and on the other hand, calcium, and magnesium, in water are removed to make the water softened. Such a water treatment device may provide purified water and washing water suitable for direct drinking for families, and is currently an important product for family lives.

An existing liquid treatment device may be, for example, a carbon block, and the carbon block may be cylindrical, and two ends of the carbon block may be covered with two gaskets for sealing. A liquid may enter the inside of the carbon block from the outside in a radial direction of the carbon block, and the liquid filtered by the carbon block may flow out through an opening in the center of the top of the carbon block. An internal space may be at the center of the carbon block for placing a post-filter in a cylindrical shape. In general, a medium for filtering may be provided in the post-filter for post-treating the liquid filtered by the carbon block. The medium for filtering may be, for example, a hollow fiber, or a packed bed medium.

The packed bed medium may be, for example, a medium based on a template-assisted crystallization (TAC) technology, which uses special polymer particles as a fluid treatment medium to make hard water minerals (such as $CaCO_3$) in the water settled and attached to surfaces of the polymer particles in forms of harmless and inactive tiny crystalline particles, and after growing to certain sizes, they are separated from the polymer particles and returned to the water, and suspend in the water in forms of non-reactive and non-adhesive grains, thereby effectively preventing formation of scales. Therefore, a fluid treatment system based on the TAC technology is different from a conventional fluid treatment system in that it does not retain hard water minerals, but only changes the hard water minerals into forms of grains.

An example of a fluid treatment system using the TAC technology is a system that uses Next-ScaleStop as a fluid treatment medium. According to the international operating regulations for preventing scales, the efficiency of the Next-ScaleStop fluid treatment medium reaches 96%, which is more effective than any other water softener. Advantages of Next-ScaleStop are: (1) no need of using any chemicals, so it is relatively environmentally friendly; (2) providing scale prevention protection for an entire house; (3) long life of medium and with no consumption of reaction; (4) retaining beneficial minerals in water; and (5) no sticky slippery feeling like soft water. The Next-ScaleStop fluid treatment medium is polymer particles with a size of 0.55 to 0.85 mm (about 20×40 mesh) and a bulk density of about 0.67 kg/l.

In the TAC soft water technology, there are many atomic-sized nucleation sites on surfaces of the polymer particles (or polymer beads) (such as Next-ScaleStop), and in these sites, dissolved hard water substances are converted into tiny "seeds". Once the seeds are generated and grow to a certain size, they will be brought away from the surfaces of the polymer particles by water flows of the template-assisted crystallization (TAC) fluid treatment medium. Therefore, the overall mechanism of TAC soft water technology is as follows that: (1) the hard water materials dissolved on the surfaces of the polymer particles with many nucleation sites are converted into tiny "seeds"; (2) as it takes several hours to grow the seeds by 10%, if the water flow stops throughout the night, sizes of the seeds released from the TAC column bed is only slightly larger than normal sizes of seeds, hence, after a few minutes of water flow, at various flow rates, sizes of the seeds released from the surfaces of the particles of the TAC column bed become normal again (the variation range is only within 10%); (3) newly-generated seeds adhere to the atomic-sized nucleation sites and grow, until they washed into the water flow, and release rates of the seeds are proportional to a flow rate of the water.

Furthermore, the packed bed medium may also be other types of media, such as a disinfection medium, which may be, for example, a medium material under a trade name Quantum Disinfection.

FIG. 1a is a front view of an existing carbon block, and FIG. 2a is a perspective view of the existing carbon block. As shown in FIGS. 1a and 2a, the carbon block includes a bare main body portion 105a and a cover 101a; wherein the main body portion 105a may include activated carbon, and the cover 101a may be bonded to both ends of the main body portion 105a by a hot melt adhesive. In addition, a surface of the cover 101a may be provided with a gasket 102a.

FIG. 3 is a schematic cross-sectional view of the existing carbon block shown in a in FIG. 1 in an axial direction. As shown in FIG. 3, a post-filter 109a may be located in an internal space of the main body portion 105a of the carbon block, and a medium 301a for filtering may be provided in the post-filter 109a. A cover 106a of the post-filter 109a is nested at the external of an upper end 107a of the main body portion 105a in an elastically deformed manner, thereby connecting the post-filter 109a and the main body portion 105a of the carbon block and sealing. The arrow in FIG. 3 represents a flow direction of the liquid. As shown in FIG. 3, the liquid enters the main body portion 105a of the carbon block in a radial direction, enters the post-filter 109a from an opening at a lower end of the post-filter 109a, and is treated by the medium 301a for filtering.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that following defects exist in the post-filter used in the existing carbon block:

1. In the existing carbon block, as shown in FIG. 3, the outer diameter of the cover 106a of the post-filter 109a is smaller than the outer diameter of the upper end 107a of the main body portion 105a, so it is difficult to remove the post-filter 109a from the main body portion 105a. In addition, in some cases, the post-filter 109a and the main body portion 105a of the carbon block are integrally arranged, and therefore, the post-filter 109a needs to be replaced together with the carbon block. However, in general, the service life of the carbon block is 3-6 months, while the service life of the filter using the TAC-based medium as the packed bed medium may be as long as 3 years. Therefore, when its service life does not expire, if the post-filter is replaced together with the carbon block, the use efficiency of the post-filter will be reduced.

2. As shown in FIG. 3, in a narrow gap between the post-filter 109a and the main body portion 105a of the carbon block, the liquid flow distribution is nonuniform, resulting in carbon at the bottom of the main body portion 105a of the carbon block being consumed faster than carbon at the top thereof, thereby increasing frequencies of carbon block replacement.

Embodiments of this disclosure provide a liquid treatment device, which may be detachably mounted with a carbon block, whereby the liquid treatment device may be replaced independent of the carbon block. Furthermore, the liquid treatment device includes an upper treatment unit and a lower treatment unit, and a liquid inlet is provided in a housing of the liquid treatment device, thereby making distribution of the liquid flow in the carbon block more uniform.

An embodiment of this disclosure provides a liquid treatment device, provided at a carbon block, the carbon block having an upper cover, the liquid treatment device being used for post-treating a liquid treated by the carbon block, the liquid treatment device including:
- a housing (305) having an accommodation space, a liquid inlet being opened in the housing for the liquid to flow into the accommodation space, and the liquid inlet at least comprising a first inlet located in a sidewall of the housing;
- a cover (106) located at an upper end of the housing, the cover being fixedly connected to the housing, covering the upper end of the housing, having a liquid outlet for the liquid to flow out of the accommodation space, being detachably covering an upper surface of the upper cover of the carbon block and a radially outer surface of the upper cover, and a radial size of the cover being larger than a radial size of the upper cover of the carbon block, whereby it is very convenient to remove the housing 305 from the carbon block;
- a sealing portion, the sealing portion being located between the cover and the upper cover of the carbon block, being used to seal between the cover and the upper cover of the carbon block, and being an annular protrusion provided on the upper surface of the upper cover of the carbon block, or being a sealing ring (201) provided between a radially internal side of the cover and a radially internal side of the upper cover of the carbon block;
- a lower treatment unit disposed in the accommodation space and configured to treat the liquid entering the lower treatment unit; and
- an upper treatment unit disposed in the accommodation space and configured to treat the liquid entering the upper treatment unit, the upper treatment unit being located above the lower treatment unit.

An embodiment of this disclosure provides a liquid treatment device, provided at a carbon block, the carbon block having an upper cover, the liquid treatment device being used for post-treatment a liquid treated by the carbon block, the liquid treatment device including:
- a housing (305) having an accommodation space, a liquid inlet being opened in the housing for liquid to flow into the accommodation space, and the liquid inlet at least comprising an inlet located at a lower end of the housing;
- a cover (106) located at an upper end of the housing, the cover being fixedly connected to the housing, covering the upper end of the housing (305), having a liquid outlet for the liquid to flow out of the accommodation space, being detachably covering an upper surface of the upper cover of the carbon block and a radially outer surface of the upper cover, and a radial size of the cover being larger than a radial size of the upper cover of the carbon block;
- a sealing portion (201), the sealing portion being located between the cover and the upper cover of the carbon block, being used to seal between the cover and the upper cover of the carbon block, and being an annular protrusion provided on the upper surface of the upper cover of the carbon block, or being a sealing ring (201) provided between a radially internal side of the cover and a radially internal side of the upper cover of the carbon block; and
- a treatment unit disposed in the accommodation space and configured to treat the liquid entering the treatment unit.

An advantage of the embodiments of this disclosure exists in that the liquid treatment device is enabled to be replaced independent of the carbon block; and furthermore, distribution of the liquid flow in the carbon block are made more uniform.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/includes" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 2a is a perspective view of the existing carbon block of FIG. 1a.

FIG. 2b is a perspective view of the example the carbon block of this disclosure;

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, the carbon block may be in a shape of a cylinder, a direction of an axis of the cylinder is referred to as an axial direction, and a direction perpendicular to the axial direction is referred to as a radial direction; one end of the carbon block for inserting the liquid treatment device is referred to as an upper end, and the other end axially opposite the upper end is referred to as a lower end; a direction from the lower end to the upper end is referred to as an upper direction, and the direction opposite to the upper direction is referred to as a lower direction; and in case where the liquid treatment device is placed in an internal space of the carbon block, description of directions of the liquid treatment device is similar to description of directions of the carbon block. It should be noted that the above definitions of the directions are only for the convenience of explanation, and is not used to limit orientations of the carbon block and the liquid treatment device during manufacture and use.

Embodiment 1

Figure 1A:
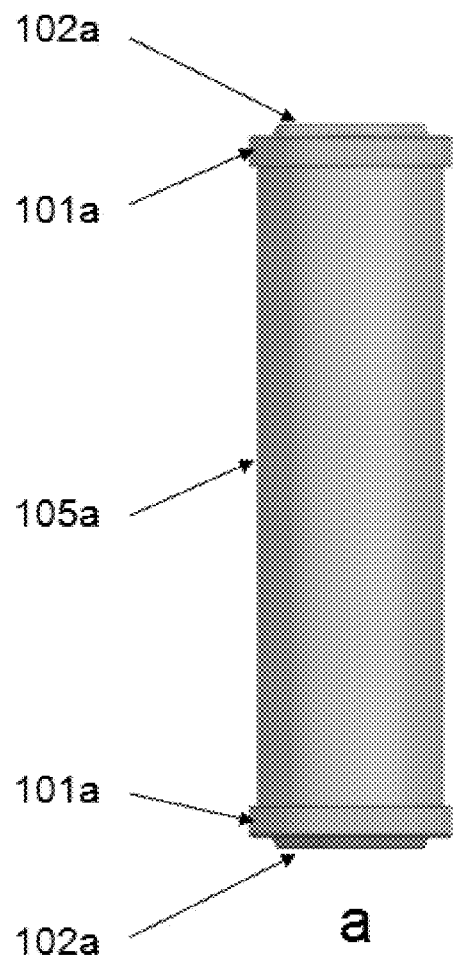
FIG. 1a is a front view of an existing carbon block.
Figure 1B:
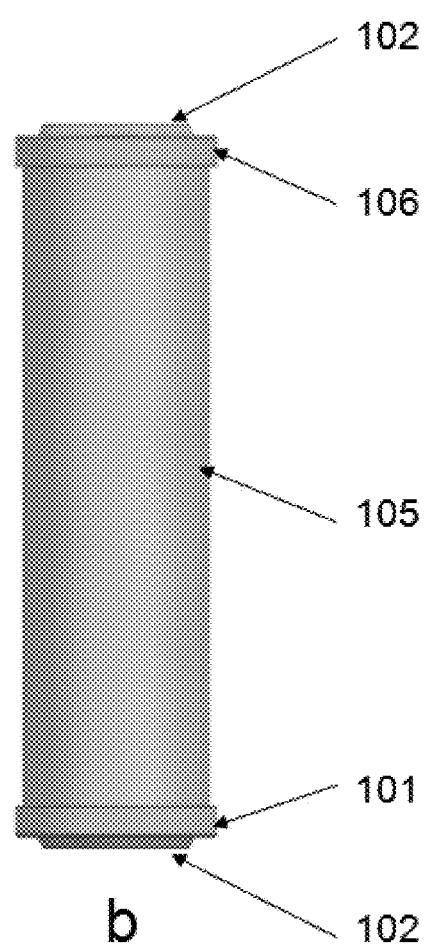
FIG. 1B is a front view of an example carbon block of this disclosure.
Figure 4:
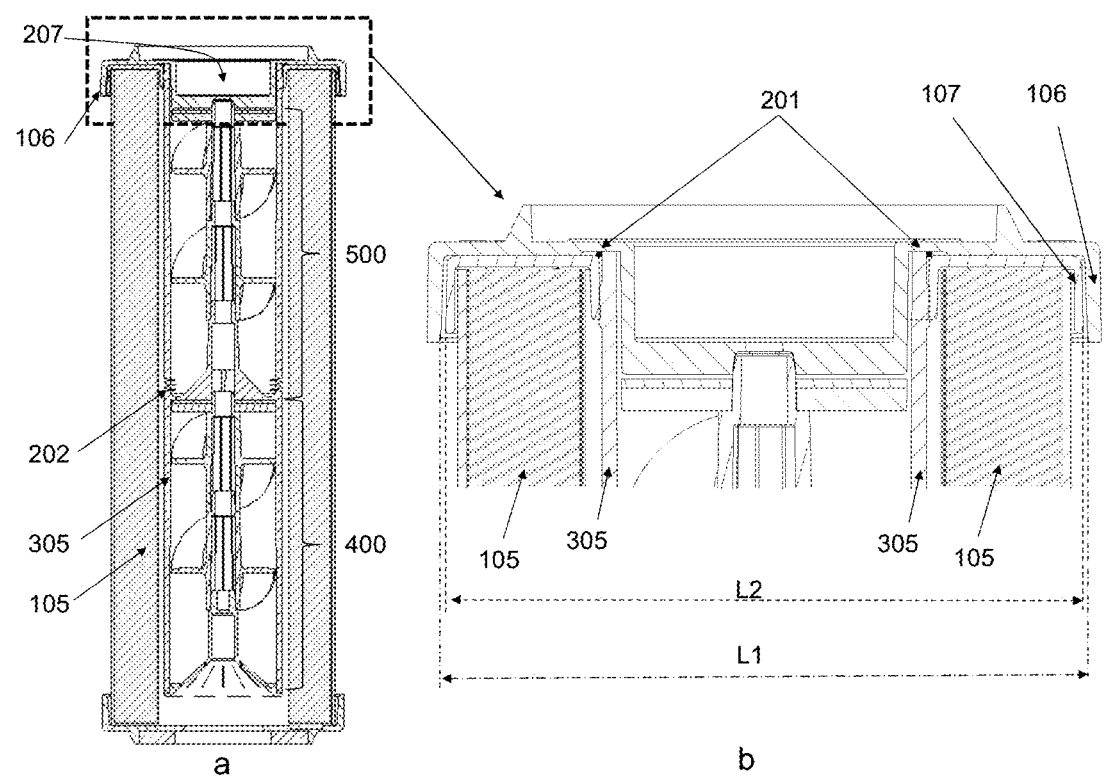
FIG. 4 is an axial cross-sectional view of a carbon block provided with the liquid treatment device of this embodiment.

Embodiment 1 of this disclosure provides a liquid treatment device, which may be provided in an internal space of a carbon block, and used for post-treating a liquid after being treated by the carbon block.

b in FIG. 1 is a front view of a carbon block provided with the liquid treatment device of this embodiment, and b in FIG. 2 is a perspective view of the liquid treatment device of this embodiment separated from the carbon block. As shown in b of FIG. 2, the carbon block includes a main body portion 105, a lower cover (lower cover) 101 and an upper cover (upper cover) 107. The main body portion 105 may include activated carbon, the upper cover 107 and the lower cover 101 may be adhered to an upper end and a lower end of the main body portion 105 by a hot melt adhesive, respectively. A liquid treatment device 109 includes a cover 106. As shown in b of FIG. 1, when the liquid treatment device 109 is mounted in an internal space of the carbon block, the cover 106 of the liquid treatment device 109 completely covers external of the upper cover 107 of the carbon block.

a in FIG. 4 is an axial sectional view of the carbon block provided with the liquid treatment device of this embodiment. As shown in a of FIG. 4, the liquid treatment device 109 of this embodiment includes a housing 305, a cover 106, a sealing portion, a lower treatment unit 400, and an upper treatment unit 500.

In this embodiment, the housing 305 includes an accommodation space, and a liquid inlet is formed in the housing 305 for liquid to flow into the accommodation space. The liquid inlet at least includes a first inlet 202 located at a sidewall of the housing.

The cover 106 is located at the upper end of the housing 305, fixedly connected to the housing 305, and covers the upper end of the housing 305. The cover 106 includes a liquid outlet 207 for the liquid to flow out of the accommodation space, and the cover 106 may detachably completely cover an upper surface of the upper cover 107 of the carbon block and cover a radially external surface of the upper cover 107. An internal diameter L1 of the cover 106 is larger than an outer diameter L2 of the upper cover 107 (as shown in b of FIG. 4), thus, it is very convenient to remove the housing 305 from the carbon block. In this embodiment, the radially external surface of the upper cover 107 is shown by 1071 in b of FIG. 2, and the radially internal surface of the upper cover 107 is shown by 1072.

The sealing portion may be located between the cover 106 and the upper cover 107 of the carbon block, and is used to seal between the cover 106 and the upper cover 107 of the carbon block.

The lower treatment unit 400 may be provided in the accommodation space to treat the liquid entering the lower treatment unit 400.

The upper treatment unit 500 may be provided in the accommodation space to treat the liquid entering the upper treatment unit 500, and the upper treatment unit 500 may be located above the lower treatment unit 400.

According to this embodiment, the liquid treatment device may be detachably mounted with the carbon block, hence, the liquid treatment device may be easily replaced independent of the carbon block; furthermore, the liquid treatment device includes an upper treatment unit and a lower treatment unit, and a liquid inlet is provided in the housing of the liquid treatment device, thereby making distribution of the liquid flow in the carbon block more uniform.

b in FIG. 4 is an enlarged view of the dotted frame portion in a of FIG. 4. As shown in b of FIG. 4, in this embodiment, the sealing portion may be a sealing ring 201 provided between a radial internal side of the cover 106 and a radial internal side of the upper cover 107 of the carbon block, and the sealing ring 201 may be, for example, O-shaped. In addition, as shown in b of FIG. 4, the sealing ring 201 may also be deemed as being located between the radial internal side of the upper cover 107 of the carbon block and the radial periphery of the housing 305, hence, the sealing ring 201 is held by the radial internal side of the upper cover 107 of the carbon block, the radial periphery of the housing 305 and the cover 106. The sealing ring 201 may be composed of a material having sealing properties against liquid, and the material may be, for example, rubber, or the like.

A method for assembling the sealing ring 201 may refer to b of FIG. 2, for example, the sealing ring 201 may be nested on the periphery of the housing 305. During the process of inserting the liquid treatment device 109 through the upper end opening of the carbon block into the internal space of the carbon block, with a friction between the sealing ring 201 and the carbon block, the sealing ring moves on the housing 305, and finally the sealing ring 201 stays between the radial internal side of the cover 106 and the radial internal side of the upper cover 107 of the carbon block, thereby making the sealing ring 201 positioned between the radial internal side of the upper cover 107 of the carbon block, the radial periphery of the housing 305 and the cover 106.

In this embodiment, the sealing portion may not be limited to the sealing ring 201, the sealing portion may also be an annular protrusion provided on an upper surface of the upper cover 107 of the carbon block, and the annular protrusion may include a ring, or more than two rings of different radii. The annular protrusion may be elastic, hence, when the cover 106 is subjected to a top-down pressure, the cover 106 and the upper cover 107 of the carbon block may be sealed therebetween.

In this embodiment, the sealing portion may be at least one of the sealing ring 201 and the annular protrusion. In addition, the sealing portion may be of other types.

In this embodiment, as shown in b of FIG. 4, a radial size (e.g. inner diameter L1) of the cover 106 is larger than a radial size (e.g. external diameter L2) of the upper cover 107 of the carbon block, thereby facilitating that the liquid treatment device 109 is easily taken out from the internal space of the carbon block.

Furthermore, as shown in b of FIG. 1 and b of FIG. 2, the surface of the lower cover 101 of the carbon block and the upper surface of the cover 106 of the liquid treatment device 109 may be respectively provided with a gasket 102, which is able to be used to seal the top and/or bottom of the carbon block.

In this embodiment, the lower treatment unit 400 and the upper treatment unit 500 of the liquid treatment device 109 may treat the liquid in a parallel manner, or may treat the liquid in a series manner.

In this embodiment, the liquid may enter the lower treatment unit 400 and the upper treatment unit 500 from different inlets, respectively, so that the lower treatment unit 400 and the upper treatment unit 500 respectively treat the liquid entering therein in a parallel manner.

Figure 5:
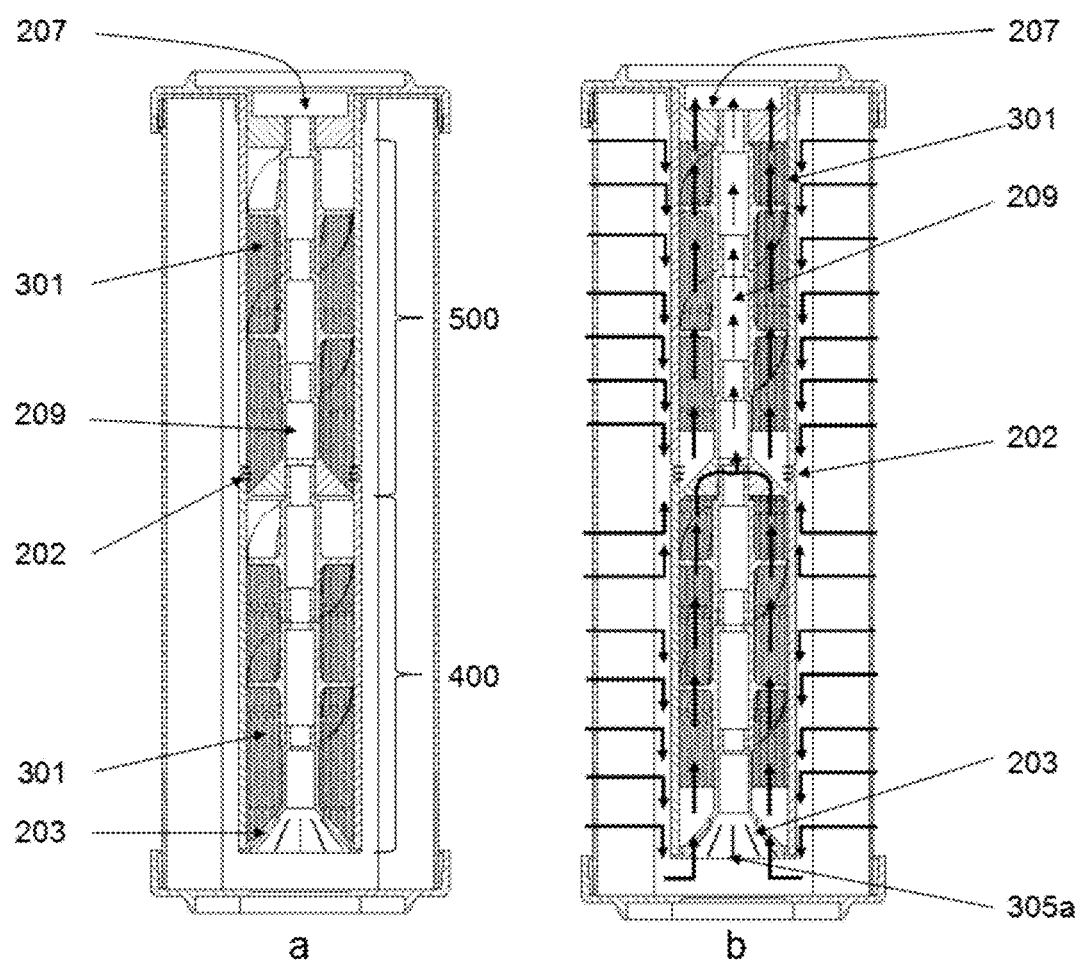
FIG. 5 is an axial cross-sectional view of the carbon block provided with the liquid treatment device of this embodiment and a schematic diagram of liquid flow thereof.

For example, in this embodiment, the liquid inlet of the liquid treatment device 109 may include, in addition to the first inlet 202, a second inlet located in the housing 305. The liquid may enter the lower treatment unit 400 via the second inlet and may be treated by the lower treatment unit 400, and the liquid treated by the lower treatment unit 400 may be guided through an upper liquid flow path in the upper treatment unit 500 (such as a guide flow path 209 described below) to a liquid outlet 207; the liquid may enter the upper treatment unit 500 through the first inlet 202, and flow out through the liquid outlet 207 after being treated by the upper treatment unit 500.

a in FIG. 5 is an axial cross-sectional view of the carbon block provided with the liquid treatment device of this embodiment, and b in FIG. 5 is a schematic diagram of liquid flow direction of a in FIG. 5. As shown in a and b of FIG. 5, in this embodiment, the second inlet may be located at the lower end of the lower treatment unit 400, for example, the second inlet may be an opening 305a at the lower end of the housing 305. The lower treatment unit 400 may have a medium 301 for filtering. The liquid entering the lower treatment unit 400 through the second inlet may be filtered by the medium 301 for filtering, and then guided to the liquid outlet 207 by the guide flow path 209 in the upper treatment unit 500. And the upper treatment unit 500 may also have a medium 301 for filtering, and the liquid entering the upper treatment unit 500 through the first inlet 202 may be filtered by the medium 301 for filtering in the upper treatment unit 500 and then reach the liquid outlet 207.

Figure 3:
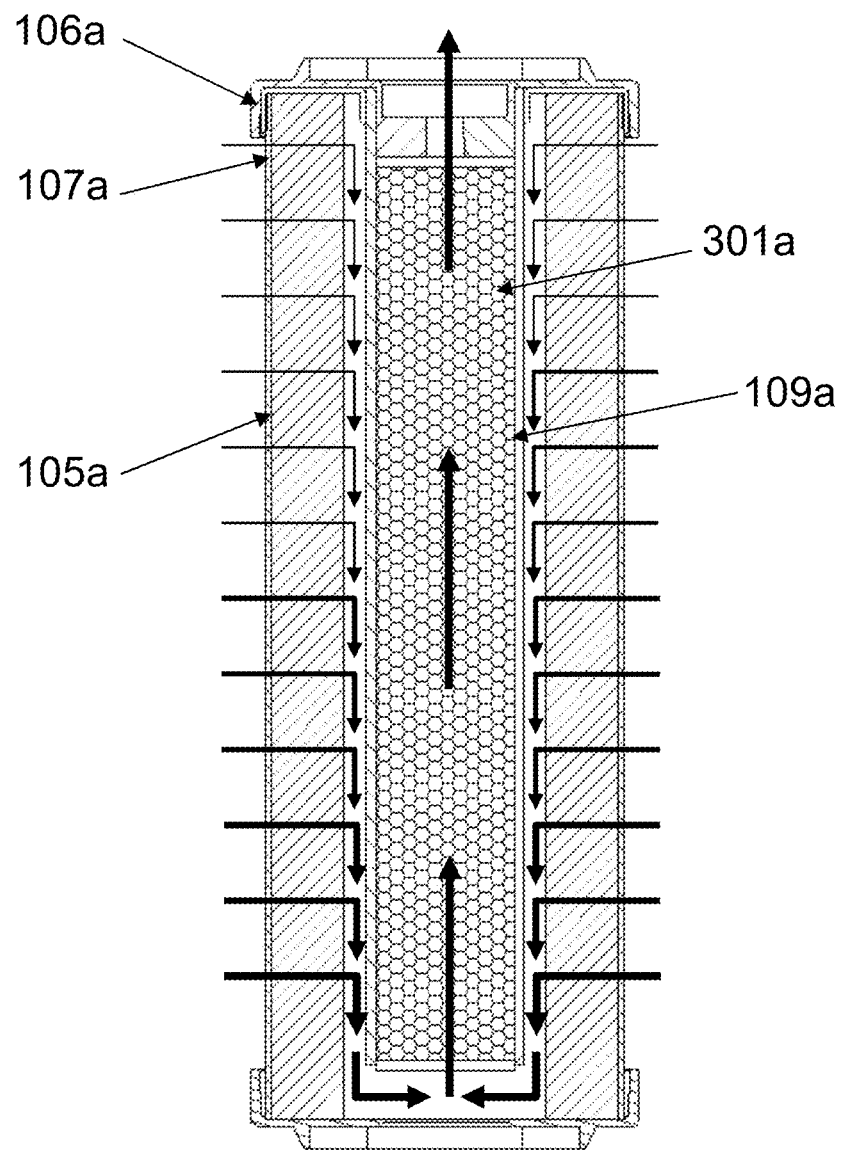
FIG. 3 is a cross-sectional view of the existing carbon block in FIG. 1a along an axial direction.

As shown in b of FIG. 5, by providing the first inlet 202 and providing the upper treatment unit 500 and the lower treatment unit 400, the water flow distribution into the carbon block is more uniform than that shown in FIG. 3.

Figure 6:
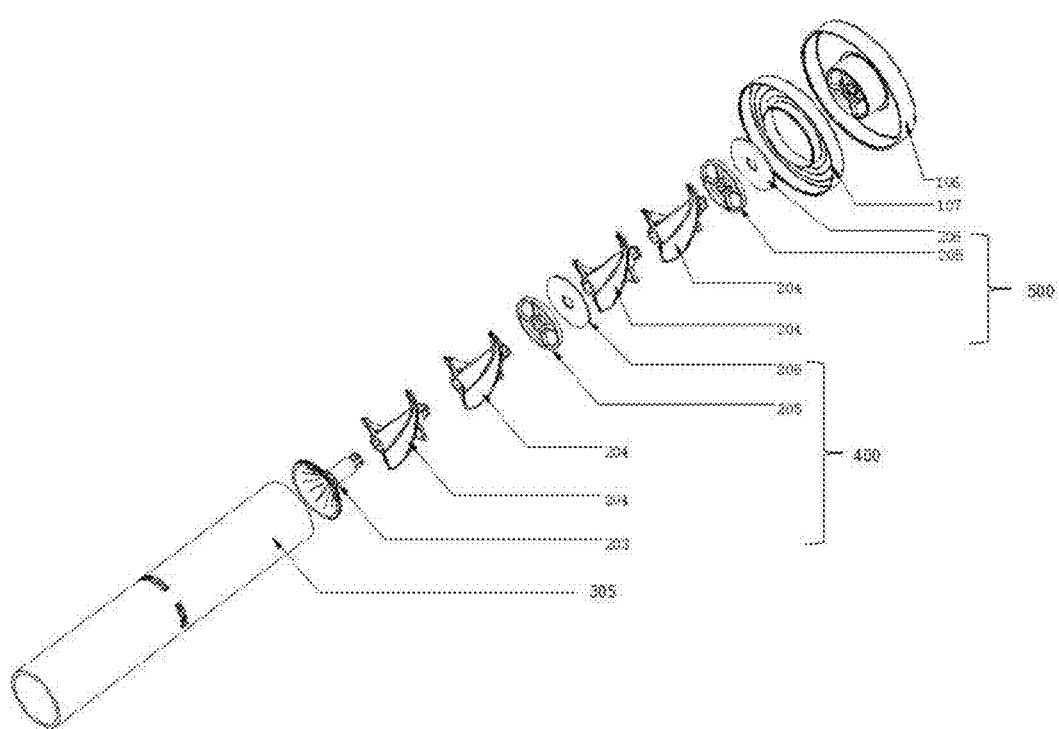
FIG. 6 is an exploded view of the liquid treatment device of FIG. 5.

FIG. 6 is an exploded view of the liquid treatment device in a of FIG. 5. The liquid treatment device 109 shown in FIG. 6 may include a cover 106, a filter 206, a holding portion 205, a spiral nozzle 204, a liquid guide 203, a housing 305 and a medium for filtering (not shown in FIG. 6).

In this embodiment, the spiral nozzle 204 includes an internal channel and a spiral fin; wherein the internal channel may allow liquid to flow through, and the spiral fin may guide the surrounding liquid to move spirally; the filter 206 may be used to hold the medium 301 for filtering. For example, the filter 206 may be a stainless steel mesh filter with a mesh size of 50 microns, which may hold particles of the medium 301 for filtering in the liquid treatment device 109; the holding portion 205 is used to hold the filter 206 in a correct position; and the liquid guide 203 may include a peripheral opening and a central channel for liquid to flow through, and is used for guiding the flow direction of the liquid.

As shown in FIG. 6, in this embodiment, the lower treatment unit 400 may include a liquid guide 203, two spiral nozzles 204, a holding portion 205, a filter 206 and a medium 301 for filtering (not shown in FIG. 6). The upper treatment unit 500 may include two spiral nozzles 204, a holding portion 205, a filter 206, and a medium 301 for filtering (not shown in FIG. 6), and an internal channel of the spiral nozzle 204 of the upper treatment unit 500 may be a part of the guide flow path 209 in the upper treatment unit 500.

In addition, a guide unit (not shown) may be provided at the upper end of the lower treatment unit 400, and the guide unit may guide the liquid treated by the lower treatment unit 400 into the guide flow path 209 in the upper treatment unit 500.

In the implementations of FIGS. 5 and 6, the first inlet 202 may be provided at an axially middle portion of the housing 305; however, this embodiment is not limited thereto, and it may also be provided at other positions in the axial direction of the housing 305.

Figure 7:
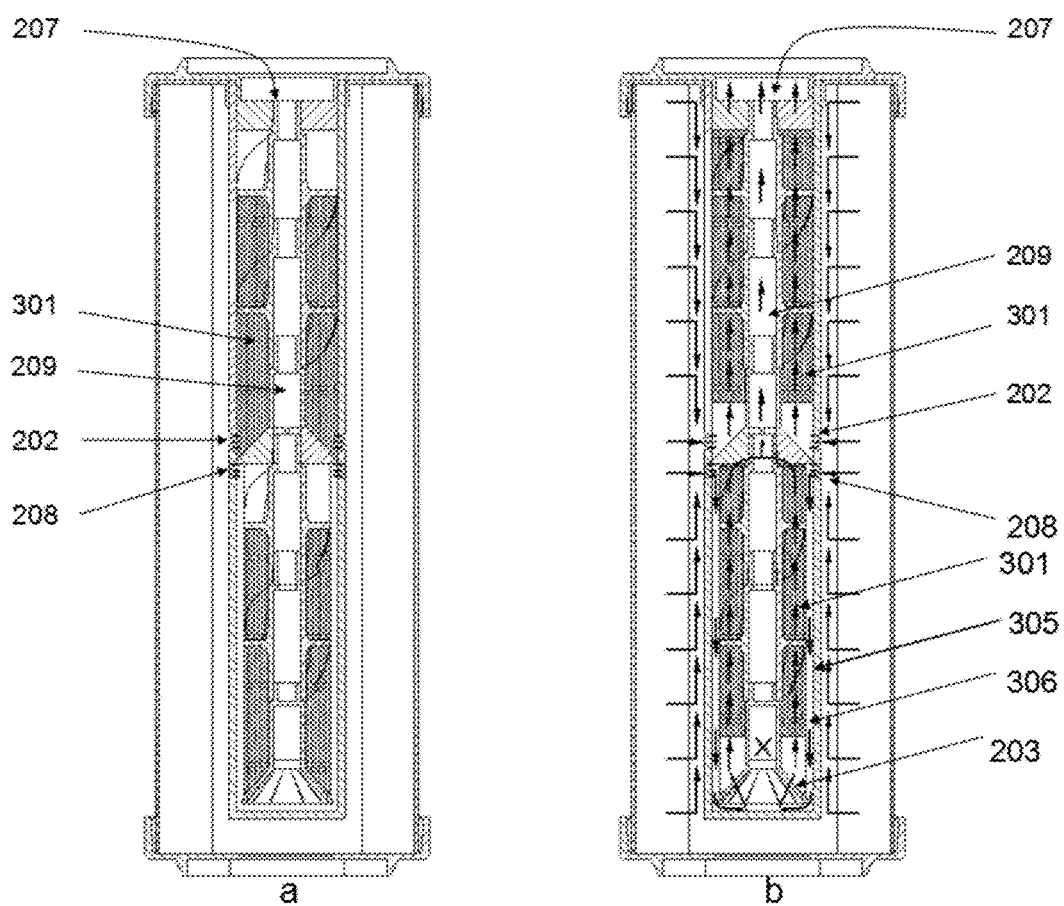
FIG. 7 is another axial cross-sectional view of the carbon block provided with the liquid treatment device of this embodiment and a schematic diagram of liquid flow thereof.

In this embodiment, the medium 301 for filtering may be a medium based on the TAC technology, or a disinfection medium, and the disinfection medium may be, for example, a medium under a trade name Quantum Disinfection; and furthermore, the medium 301 may also be of other types.

a in FIG. 7 is another axial cross-sectional view of the carbon block provided with the liquid treatment device of this embodiment, and b in FIG. 7 is a schematic diagram of the liquid flow direction of a in FIG. 7. The components denoted by identical reference numerals in FIG. 7 and FIG. 5 are identical. Differences between FIG. 7 and FIG. 5 are that positions of the second inlet are different, and flow paths of the liquid in the lower treatment unit 400 are different.

As shown in FIG. 7, the second inlet is located in a sidewall of a part of the housing to which the lower treatment unit corresponds. For example, the second inlet may be located at a position at a sidewall of the housing 305 radially opposite to the lower treatment unit 400, and the lower end of the lower treatment unit 400 is closed. For example, the second inlet may be an opening 208 located in a sidewall of the housing 305, and the opening 208 may be at a predetermined position beneath the first inlet 202.

As shown in FIG. 7, the lower treatment unit 400 may also include the medium 301 for filtering, and a lower liquid flow path 306 may be provided between the medium 301 for filtering and the housing 305. The liquid entering the lower treatment unit 400 through the second inlet may be guided by the lower liquid flow path 306 to enter the filtering medium 301 from the lower end of the filtering medium 301 through the liquid guide 203, and the liquid after being filtered by the medium 301 for filtering may enter the guide flow path 209 of the upper treatment unit 500 and may be guided to the liquid outlet 207.

In FIG. 7, in order to allow the liquid entering the lower treatment unit 400 to adequately contact the medium 301 for filtering, the central channel of the liquid guide 203 may be closed.

As shown in b of FIG. 7, by arranging the second inlet at a position in the sidewall of the housing 305 that is radially opposite to the lower treatment unit 400, the distribution of the liquid flowing into the carbon block may be made more uniform, and by adjusting a distance between the second inlet and the first inlet 202, uniformity of distribution of the liquid may be adjusted.

In this embodiment, the liquid may enter the liquid treatment device 109 only through the first inlet 202, so that the lower treatment unit 400 and the upper treatment unit 500 treat the liquid entering the liquid treatment device 109 in a series manner.

Figure 8:
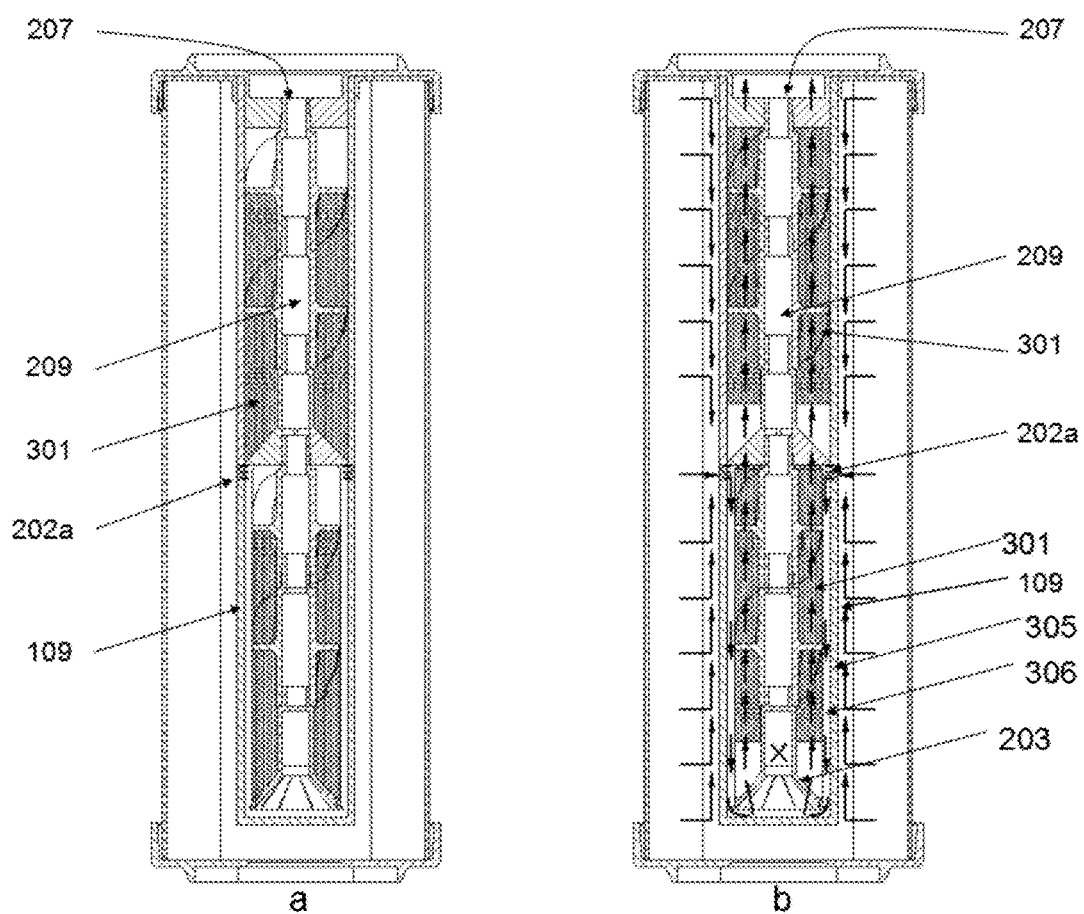
FIG. 8 is a further axial cross-sectional view of the carbon block provided with the liquid treatment device of this embodiment and a schematic diagram of liquid flow thereof.

The first inlet may be located in a sidewall of a part of the housing to which the lower treatment unit corresponds. For example, the first inlet may be located at a position on the sidewall of the housing 305 that is radially opposite to the lower treatment unit 400, and the liquid enters the lower treatment unit 400 through the first inlet, enters the upper treatment unit 500 after being processed by the lower treatment unit 400, and then the liquid is processed by the upper treatment unit 500. And the liquid processed by the upper treatment unit 500 flows out of the accommodation space through the liquid outlet 207.

a in FIG. 8 is a further axial cross-sectional view of the carbon block provided with the liquid treatment device of this embodiment, and b in FIG. 8 is a schematic diagram of the liquid flow direction of a in FIG. 8. The components denoted by identical reference numerals in FIG. 8 and FIG. 7 are identical. Differences between FIG. 8 and FIG. 7 are that a position of the first inlet 202a in FIG. 8 is different from a position of the first inlet 202 in FIG. 7, FIG. 8 does not include a second inlet, and flow paths of the liquid in the lower treatment unit are different.

As shown in FIG. 8, the first inlet 202a may be located at a position of the sidewall of the housing 305 that is radially opposite to the lower treatment unit 400. For example, the position of the first inlet 202a may be the same as the position of the opening 208 in FIG. 7.

In an implementation shown in FIG. 8, the lower end of the lower treatment unit 400 is closed, for example, the lower end of the housing 305 is closed. The lower treatment unit 400 has a medium 301 for filtering, and there exists a lower liquid flow path 306 between the medium 301 for filtering and the housing 305.

As shown in FIG. 8, the liquid entering the lower treatment unit 400 through the first inlet 202a is guided by the lower liquid flow path 306 to enter the medium 301 for filtering from the lower end of the medium 301 for filtering, the liquid filtered by the medium 300 for filtering is guided into the upper treatment unit 500, and is filtered by the medium 301 for filtering in the upper treatment unit 500.

Figure 9:
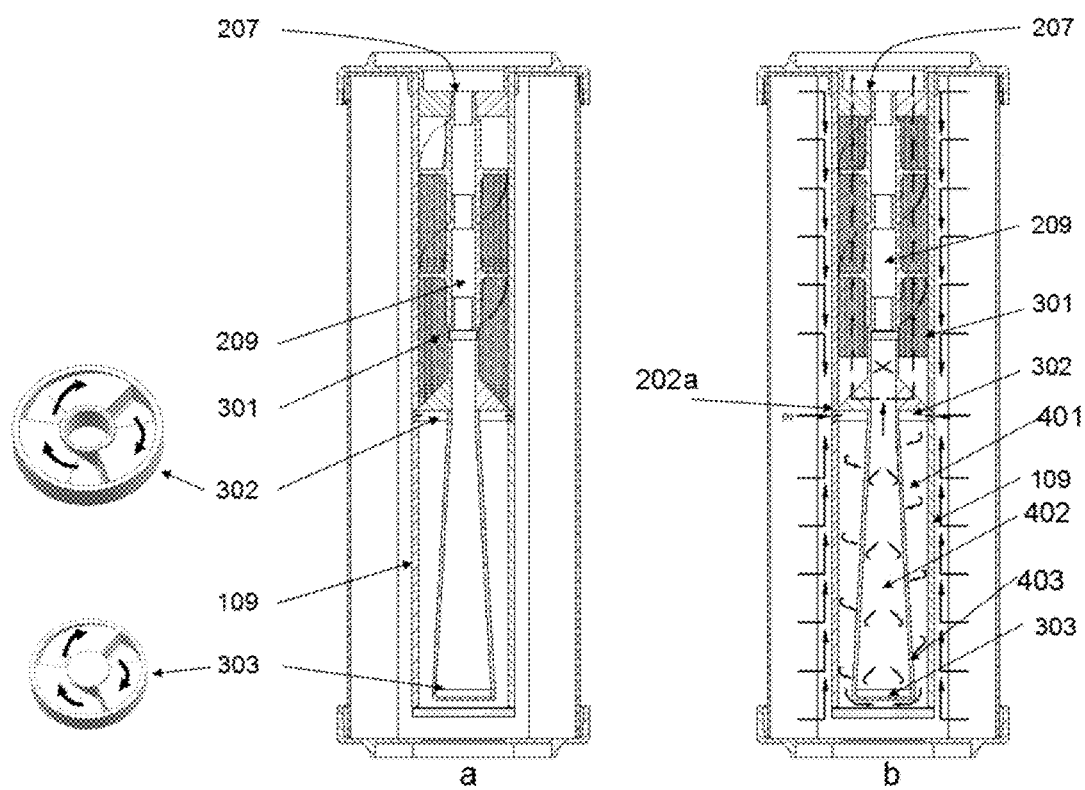
FIG. 9 is yet another axial cross-sectional view of the carbon block provided with the liquid treatment device of this embodiment and a schematic diagram of liquid flow thereof.

Furthermore, in FIG. 8, a guide structure (not shown) may be provided for the liquid treated by the lower treatment unit 400 to flow to the medium 301 for filtering in the upper treatment unit 500.

a in FIG. 9 is yet another axial cross-sectional view of the carbon block provided with the liquid treatment device of this embodiment, and b in FIG. 9 is a schematic diagram of the liquid flow direction of a in FIG. 9. The components denoted by identical reference numerals in FIG. 9 and FIG. 8 are identical. Differences between FIG. 9 and FIG. 8 are that flow paths of the liquid in the liquid treatment device are different, and treatment experienced by the liquid in the lower treatment unit 400 is different. For example, the lower treatment unit 400 may not include the medium 301 for filtering, hence, the lower treatment unit 400 does not filter the liquid, but only guides the liquid.

As shown in FIG. 9, the lower end of the lower treatment unit 400 may be closed, and the lower treatment unit 400 may include a lower housing 403 and an upper guide portion 302 and a lower guide portion 303 located at both axial ends of the lower housing 403.

As shown in FIG. 9, a first lower liquid flow path 401 is formed between the lower housing 403 and the housing 305, a second lower liquid flow path 402 is formed inside the lower housing 403, and the liquid entering the lower treatment unit 400 through the first inlet 202a is guided to the lower guide portion 303 by the upper guide portion 302 and the first lower liquid flow path 401, and is further guided to the upper treatment unit 500 by the lower guide portion 303 and the second lower liquid flow path 402, and is filtered by the medium 301 for filtering in the upper treatment unit 500.

As shown in FIG. 9, the lower housing 403 may be of a cylindrical shape with an upper portion smaller than a lower portion, and the upper guide portion 302 may include a central through hole. The lower end of the lower housing 403 may accommodate the lower guide portion 303, and the upper end of the lower housing 403 may be accommodated in the central through hole of the upper guide portion 302.

As shown in FIG. 9, the surface of the upper guide member 302 may include a spiral guide surface to guide the liquid to move spirally; and the surface of the lower guide portion 303 may have a spiral guide surface to guide the liquid to move spirally. In addition, in this embodiment, the components of the liquid treatment device 109 may not be limited to the cases shown in b of FIG. 1, b of FIG. 2 and FIGS. 4-9. For example, the housing 305 of the liquid treatment device 109 may not include the first inlet located at the sidewall of the housing, but only includes an opening at the lower end of the housing, the opening being taken as a liquid inlet. Furthermore, the lower treatment unit 400 and the upper treatment unit 500 may be combined into one treatment unit, that is, the cover 106a of FIG. 3 is replaced with 106 of FIG. 4 to obtain a variant of the liquid treatment device 109 of this embodiment. In this variant, as an inner diameter of the cover 106 is larger than an outer diameter of the upper cover 107, it is very convenient for the housing 305 to be removed from the carbon block.

This disclosure is described above with reference to particular embodiments. However, it should be understood by those skilled in the art that such description is illustrative only, and is not intended to limit the protection scope of the present disclosure. Various variants and modifications may be made by those skilled in the art according to the principle of this disclosure, and such variants and modifications fall within the scope of this disclosure.

The invention claimed is:

1. A liquid treatment device, comprising:
a carbon block, the carbon block having an upper cover;
a first liquid treatment unit used for post-treating a liquid treated by the carbon block, the first liquid treatment unit including:
a housing having an accommodation space, a liquid inlet opened in the housing for the liquid to flow into the accommodation space, the liquid inlet at least including a first inlet located in a sidewall of the housing;
a cover located at an upper end of the housing, the cover fixedly connected to the housing, the cover covering the upper end of the housing, the cover having a liquid outlet for the liquid to flow out of the accommodation space, the cover detachably covering an upper surface of the upper cover of the carbon block and a radially outer surface of the upper cover, and a radial size of the cover larger than a radial size of the upper cover of the carbon block;
a sealing portion, the sealing portion located between the cover and the upper cover of the carbon block, the sealing portion used to seal between the cover and the upper cover of the carbon block, and the sealing portion is an annular protrusion provided on the upper surface of the upper cover of the carbon block, or a sealing ring provided between a radially internal side of the cover and a radially internal side of the upper cover of the carbon block;
a lower treatment unit disposed in the accommodation space and configured to treat the liquid entering the lower treatment unit; and
an upper treatment unit disposed in the accommodation space and configured to treat the liquid entering the upper treatment unit, the upper treatment unit located above the lower treatment unit,
wherein:
the liquid inlet further includes a second inlet located in the housing;
the liquid enters the lower treatment unit through the second inlet and is treated by the lower treatment unit, and the liquid treated by the lower treatment unit is guided to the liquid outlet through an upper liquid flow path located in the upper treatment unit;
and the liquid enters the upper treatment unit through the first inlet and flows out from the liquid outlet after being treated by the upper treatment unit;
the second inlet is located in a sidewall of the housing to which the lower treatment unit corresponds, and the lower end of the lower treatment unit is closed;
the lower treatment unit has a medium for filtering, and there exists a lower liquid flow path between the medium for filtering and the housing; and
the liquid entering the lower treatment unit from the second inlet is guided by the lower liquid flow path to enter the medium for filtering from a lower end of the medium for filtering, and the liquid filtered by the medium for filtering is guided by a guide flow path in the upper treatment unit.

2. The liquid treatment device according to claim 1, wherein the cover is removable from the carbon block and the housing is removable from the carbon block.

* * * * *